(12) United States Patent
Horley et al.

(10) Patent No.: US 8,533,685 B2
(45) Date of Patent: Sep. 10, 2013

(54) PROCESSING APPARATUS, TRACE UNIT AND DIAGNOSTIC APPARATUS

(75) Inventors: John Michael Horley, Cambridge (GB); Simon John Craske, Cambridge (GB); Michael John Gibbs, Cambridge (GB); Paul Anthony Gilkerson, Cambridge (GB)

(73) Assignee: ARM Limited, Cambridge (GB)

( * ) Notice: Subject to any disclaimer, the term of this patent is extended or adjusted under 35 U.S.C. 154(b) by 0 days.

(21) Appl. No.: 13/317,686

(22) Filed: Oct. 26, 2011

(65) Prior Publication Data

US 2012/0185676 A1    Jul. 19, 2012

(30) Foreign Application Priority Data

Jan. 13, 2011 (GB) .................................. 1100505.5

(51) Int. Cl.
*G06F 9/44* (2006.01)
(52) U.S. Cl.
USPC .............................. 717/128; 714/45; 717/127
(58) Field of Classification Search
None
See application file for complete search history.

(56) References Cited

U.S. PATENT DOCUMENTS

| | | | |
|---|---|---|---|
| 5,715,440 A | 2/1998 | Ohmura et al. | |
| 5,978,902 A | 11/1999 | Mann | |
| 6,247,146 B1 | 6/2001 | Wheatley et al. | |
| 6,728,949 B1 * | 4/2004 | Bryant et al. | 717/127 |
| 7,100,024 B2 * | 8/2006 | Col | 712/218 |
| 7,707,394 B2 | 4/2010 | Ashfield et al. | |
| 8,286,141 B2 * | 10/2012 | Naruse | 717/128 |
| 8,312,435 B2 * | 11/2012 | Wygodny et al. | 717/130 |
| 2002/0046393 A1 * | 4/2002 | Leino et al. | 717/7 |
| 2003/0033592 A1 * | 2/2003 | Tsubata et al. | 717/128 |
| 2003/0051122 A1 * | 3/2003 | Sato | 712/227 |
| 2004/0030962 A1 * | 2/2004 | Swaine et al. | 714/45 |
| 2004/0064685 A1 | 4/2004 | Nguyen et al. | |
| 2004/0123084 A1 * | 6/2004 | DeWitt, Jr. et al. | 712/227 |
| 2006/0129999 A1 * | 6/2006 | Hiraoka et al. | 717/128 |
| 2009/0187790 A1 * | 7/2009 | Williams et al. | 714/37 |
| 2012/0185734 A1 * | 7/2012 | Gilkerson et al. | 714/45 |

FOREIGN PATENT DOCUMENTS

| | | |
|---|---|---|
| GB | 2459652 | 11/2009 |
| JP | 62-3351 | 1/1987 |

OTHER PUBLICATIONS ip.com more-like-this search Claim 9 search results.*
ip.com more-like-this search Claim 11 search results.*
ip.com more-like-this search Claim 24 search results.*
ip.com more-like-this-one search US20120185676 search results.*
Masao et al. "Processor capable of collecting trace data" JP2002342114 abstract, Espacenet.*

(Continued)

*Primary Examiner* — Don Wong
*Assistant Examiner* — Adam Conkey
(74) *Attorney, Agent, or Firm* — Nixon & Vanderhye P.C.

(57) ABSTRACT

A processing circuit 4 is responsive to at least one conditional instruction to perform a conditional operation in dependence on a current value of a subset of at least one condition flag 22. A trace circuit 6 is provided for generating trace data elements indicative of operations performed by the processing circuit 4. When the processing circuit 4 processes at least one selected instruction, then the trace circuit 6 generates a trace data element including a traced condition value indicating at least the subset of condition flags 22 required to determine the outcome of the conditional instruction. A corresponding diagnostic apparatus 12 uses the traced condition value to determine a processing outcome of the at least one conditional instruction.

19 Claims, 11 Drawing Sheets

(56) References Cited

OTHER PUBLICATIONS

Search Report for GB 1100505.5, dated May 12, 2011.
Search Report for GB 1101945.2 dated May 24, 2011.

International Search Report and Written Opinion of the International Searching Authority dated Apr. 4, 2012 in PCT/GB2011/052353.
International Search Report and Written Opinion of the International Searching Authority dated Apr. 4, 2012 in PCT/GB2011/052242.

* cited by examiner

Condition code suffixes

| Suffix | Flags | Meaning |
|---|---|---|
| EQ | z set | Equal |
| NE | z clear | Not equal |
| CS or HS | c set | Higher or same (unsigned >= ) |
| CC or LO | c clear | Lower (unsigned < ) |
| MI | N set | Negative |
| PL | N clear | Positive or zero |
| VS | v set | Overflow |
| VC | v clear | No overflow |
| HI | c set and z clear | Higher (unsigned >) |
| LS | c clear or z set | Lower or same (unsigned <=) |
| GE | N and v the same | Signed >= |
| LT | N and v differ | Signed < |
| GT | z clear, N and v the same | Signed > |
| LE | z set, N and v differ | Signed <= |
| AL | Any | Always. This suffix is normally omitted. |

FIG. 2

| CPSR identifier | Meaning |
|---|---|
| 00 | C set |
| 01 | N set |
| 10 | Z and C set |
| 0011 | N and C set |
| 0111 | no flags set |
| 1011 | Z set |
| 1111 | null |

FIG. 3

| Program instructions | | Trace | Diagnostic interpretation |
|---|---|---|---|
| 1600 | Branch (2000) | Branch taken | go to 2000 |
| 2000 | ⋮<br>CMP | CPSR | use this CPSR for following conditionals |
| 2004 | MOV NE | | determine outcome based on CPSR for 2000 |
| 2008 | MOV EQ | | determine outcome based on CPSR for 2000 |
| 200C | ADD HI | | determine outcome based on CPSR for 2000 |
| 2100 | ⋮<br>CCMP NE | CPSR | determine outcome based on CPSR for 2000<br>use new CPSR for following conditional |
| 2104 | ADD EQ | | determine outcome based on CPSR for 2100 |

FIG. 6

⋮
CMP
CMP
CMP
TST
CMP
MOV NE
⋮

FIG. 7

| Program instructions | Trace | Control flag | Diagnostic interpretation |
|---|---|---|---|
| 1600    Branch (2000)<br>⋮ | Branch taken | X | go to 2000 |
| 2000    CMP | | clear to 0 | |
| 2004    MOV NE | CPSR | set to 1 | determine processing outcome based on CPSR for 2004 |
| 2008    MOV EQ | | 1 | determine processing outcome based on CPSR for 2004 |
| 200C    ADD HI | | 1 | determine processing outcome based on CPSR for 2004 |
| ⋮ | | ⋮ | |
| 2100    CCMP NE | | clear to 0 | determine processing outcome based on CPSR for 2004 |
| 2104    ADD EQ | CPSR | set to 1 | determine processing outcome based on CPSR for 2104 |

FIG. 10

| Program instructions | | Trace | Control flags | | | | Diagnostic interpretation |
|---|---|---|---|---|---|---|---|
| | | | N | Z | C | V | |
| 1600 | Branch (2000) | Branch taken | x | x | x | x | go to 2000 |
| ... | | | | | | | |
| 2000 | CMP | | clear to 0 | clear to 0 | clear to 0 | clear to 0 | |
| 2004 | MOV NE | CPSR (Z) | 0 | set to 1 | 0 | 0 | determine processing outcome based on CPSR for 2004 |
| 2008 | MOV EQ | | 0 | 1 | 0 | 0 | determine processing outcome based on CPSR for 2004 |
| 200C | ADD HI | CPSR (C) | 0 | 1 | set to 1 | 0 | determine processing outcome based on CPSR for 2004 and CPSR for 200C |
| ... | | | | | | | |
| 2100 | CMP NE | | 0 | clear to 0 | clear to 0 | 0 | determine processing outcome based on CPSR for 2004 |
| 2104 | ADD EQ | CPSR (Z) | 0 | set to 1 | 0 | 0 | determine processing outcome based on CPSR for 2104 |

PROCESSING APPARATUS, TRACE UNIT AND DIAGNOSTIC APPARATUS

TECHNICAL FIELD

The present invention relates to the field of data processing. More particularly, the invention relates to tracing processing operations performed by a processing apparatus, and analysing the trace data produced during tracing.

BACKGROUND

In a processing apparatus, a trace circuit may be provided for monitoring processing operations performed by a processing circuit and generating trace data indicative of the processing operations performed. A diagnostic apparatus may analyse the trace data, in order to deduce a processing outcome of the processing operations. The processing outcome can be checked against an expected outcome to verify whether or not the processing apparatus is operating correctly.

A processing apparatus may execute conditional instructions which specify an associated condition. The processing outcome of a conditional instruction is dependent on whether the associated condition is satisfied at the time of execution of the conditional instruction. When execution of a conditional instruction is traced by a trace circuit, then the trace circuit may generate trace data including an indication of whether or not the condition was passed or failed. When analysing the trace data then the pass/fail indication can be used to determine the outcome of the conditional instruction.

However, when tracing some advanced processors, the pass/fail result of a conditional result can be difficult to obtain. Some processors may comprise processing pipelines having multiple execution stages in parallel with one another. Some processors may perform out-of-order execution of instructions to improve performance. Accordingly, it can be difficult to predict in advance when, and at which point in the pipeline, the pass/fail result will become available. The present technique seeks to simplify the tracing of conditional instructions.

SUMMARY

Viewed from one aspect, the present invention provides a processing apparatus comprising:
processing circuitry configured to perform processing operations in response to program instructions;
a condition status storage location configured to store at least one condition flag indicating a condition of said processing circuitry; and
trace circuitry configured to generate trace data elements indicative of said processing operations performed by said processing circuitry in response to said program instructions; wherein:
said processing circuitry is responsive to at least one conditional instruction to perform a conditional operation in dependence on a current value of a subset of said at least one condition flag; and
said trace circuitry is configured, in response to said processing circuitry processing at least one selected instruction, to generate a trace data element including a traced condition value indicative of at least said subset of said at least one condition flag, said traced condition value providing information for determining a processing outcome of said at least one conditional instruction.

A processing apparatus may have a condition status storage location (e.g. a register) for storing at least one condition flag indicating a condition of the processing circuit. The processing circuit may execute a conditional instruction in dependence on a current value of at least a subset of the at least one condition flag. For example, when a conditional instruction is executed, then its associated conditional operation may be performed if the current value of the subset of the condition flags satisfies a given condition, while no operation may be performed if the condition is not satisfied. The trace circuitry may be configured, in response to the processing circuitry processing at least one selected instruction, to generate a trace data element including a traced condition value indicative of at least the subset of the at least one condition flag on which the conditional instruction is dependent. The traced condition value provides information for determining the processing outcome of the at least one conditional instruction.

The present technique recognises that the values of the condition flags are typically more easily available than the pass/fail result of the conditional instruction. For example, the condition flags are often part of the architectural state of the processing apparatus, and so the condition flags can be read at an early stage of a processing pipeline without needing to monitor when, and at which stage of the pipeline, the execution result of the instruction becomes available. Therefore, by tracing the condition flag values rather than the pass/fail result, the configuration of the trace circuitry is simplified.

The traced condition value may have different forms. In one example, the traced condition value may comprise the current values of at least the subset of the at least one condition flag. Hence, the trace data element identifies the condition flag values directly.

Alternatively, the traced condition value may comprise an identifier identifying a value of at least the subset of the at least one condition flag. This may in some cases be more efficient than tracing the actual values of the condition flags. For example, if certain patterns of values of the condition flags are more common than other patterns, then the most common patterns can be assigned a particular identifier having fewer bits than the actual values of condition flags. This will tend to reduce the amount of trace data generated by the trace circuit, thus easing constraints on trace bandwidth.

The point of the instruction stream at which the condition flags are traced may vary and need not necessarily be the conditional instruction whose outcome is to be determined using the traced condition value. The traced condition value may be output at any selected instruction.

In one example, the processing circuitry is responsive to at least one condition updating instruction to perform an associated processing operation and update the at least one condition flag in dependence on a processing outcome of the associated processing operation. In this case, the at least one selected instruction which triggers tracing of the condition flags may comprise the at least one condition updating instruction. For example, the condition updating instruction may comprise a compare instruction which compares two data values and updates the at least one condition flag based on the result of the comparison, and the at least one condition flag may be traced on execution of the compare instruction. The traced condition value included in the trace stream when the at least one condition flag is updated provides information for determining whether any subsequent conditional instructions passed or failed their associated condition.

When the traced condition value is output upon execution of the at least one condition updating instruction, then the traced condition value may indicate an updated value of the condition flag which results from processing the at least one condition updating instruction. Hence, this updated value can be used to determine outcomes of any subsequent conditional instructions which occur before a next update of the condition flag.

The at least one condition updating instruction need not include every condition updating instruction that is executed by the processing circuit. In some situations, there may be several condition updating instructions occurring in succession without any intervening conditional instruction, in which case only the condition flag value resulting from the last condition updating instruction would be used by a conditional instruction. Hence, it would not be necessary to generate a traced condition value for all of the condition updating instructions.

Alternatively, or in addition to the at least one condition updating instruction, the at least one selected instruction may include at least one of the at least one conditional instruction. In some situations, at the time of execution of the condition updating instruction it may be difficult to determine whether any subsequent condition instruction will actually use the updated condition flag value generated by that condition updating instruction. Hence, it may be more efficient to instead wait until a conditional instruction uses the at least one condition flag before tracing at least the subset of the at least one condition flag that is used by that conditional instruction.

When the traced condition value is output upon execution of a conditional instruction, then the traced condition value may indicate the current value of at least the relevant subset of the at least one condition flag at the time of processing the conditional instruction.

Again, it is not always necessary to output a traced condition value upon execution of every conditional instruction. A program may include a complementary pair of conditional instructions associated with mutually exclusive conditions. For example a first conditional instruction which is dependent on a previous processing operation generating an "equal" result may be followed by a second conditional instruction which is dependent on the previous processing operation generating a "not equal" result. In this case, it would not be necessary to trace the condition flag value for the second conditional instruction because its processing outcome can be determined from a traced condition value generated for the first conditional instruction. Hence, in some situations it may be preferable for the selected instruction to comprise a first conditional instruction processed after an update of the at least one condition flag.

Not all types of conditional instruction or condition updating instruction need to be traced by the trace unit. In some examples, only a subset of types of instruction may be of interest. In this case, only the relevant subset of the conditional instructions or conditional updating instructions would trigger output of the trace data element including the traced condition value. The trace circuit may be configured to select which of the program instructions are included in the at least one selected instruction for triggering generation of the trace data element including the traced condition value. For example, the trace circuitry may be responsive to control signals indicating the instructions for which the condition flags should be traced, for example only particular conditional instructions such as conditional store instructions.

Note that some kinds of instruction may be both a conditional instruction and a condition updating instruction. For example, a conditional compare instruction may have an associated condition and may specify a comparison to be performed if the associated condition is satisfied. On execution of the conditional compare instruction, if the associated condition is satisfied by the current values of the at least one condition flag then the comparison is performed and the at least one condition flag is updated based on the result of the comparison. The conditional compare instruction may therefore be traced either as a conditional instruction or as a condition updating instruction, or both, depending on the configuration of the trace circuitry.

The trace circuitry may be configured to store a control flag and the trace circuitry may be responsible to the control flag to select whether a particular program instruction triggers generation of the trace data element including the traced condition value. For example, the trace circuitry may use the control flag to keep track of whether the current state of the at least one condition flag has already been traced, and then use the control flag to determine whether or not the at least one condition flag should be traced on a subsequent instruction.

In one example, the control flag has a first state and a second state. For example, the control flag may comprise a bit having a "0" value indicating one of the first and second states and a "1" value indicating the other of the first and second states. The trace circuitry may be responsive to an update of the at least one condition flag to place the control flag in the first state, and may be responsive to the processing circuitry processing a conditional instruction to (a) determine whether said control flag is in said first state; and (b) if said control flag is in said first state, generate a trace data element including said traced condition value and place said control flag in said second state.

Hence, the first state of the control flag indicates that the at least one condition flag has been updated, but that the updated value of the at least one condition flag has not yet been traced. If the control flag is in the first state when a conditional instruction to be traced is executed, then a trace data element is generated including the traced condition value, so that the processing outcome of the conditional instruction can be determined from the trace data. Following generation of a trace data element including a traced condition value, the control flag is placed in the second state to indicate that the current state of the at least one condition flag has already been traced and so it is not necessary to trace the at least one condition flag again on execution of a subsequent conditional instruction. The control flag is returned to the first state when the at least one condition flag has been updated once more. This technique helps to reduce the amount of trace data, because the trace data element including the traced condition value is not generated if the processing outcome of the corresponding instruction can already be determined from the traced condition value included in a previously generated trace data element.

In some embodiments, the condition status storage location may be configured to store a plurality of condition flags corresponding to respective conditions of the processing circuitry. For example, in processors designed by ARM Limited of Cambridge, UK, the condition flags typically include an N flag indicating whether or not a previous processing result was a negative value, a Z flag indicating whether or not a previous processing result was zero, a C flag indicating whether or not a previous processing operation resulted in a carry operation, and a V flag indicating whether or not a previous processing operation resulted in an overflow. Other types of condition flags are also possible.

In the case where there are a plurality of condition flags, a particular conditional instruction need not be dependent on all of the condition flags, but may be dependent on any subset of those condition flags. When tracing the current value of the condition flags, then the amount of trace data can be reduced by generating the trace data element with the traced condition value indicating the relevant subset of the plurality of condition flags. Condition flags which are not part of the subset may be omitted from being included in the trace data element.

On the other hand, the trace circuitry may also be configured to generate the trace data element with the traced condition value being indicative of all of the plurality of condition flags, regardless of which subset of condition flags are actually being used by the conditional instruction. This may in some situations reduce the complexity of the hardware provided for accessing values of the condition flags, since then it would not be necessary to provide circuitry for accessing individual flags of the condition status storage location.

In an embodiment, the trace circuitry may be configured to store a plurality of control flags corresponding to the plurality of condition flags. The trace circuitry may be responsive to each control flag to select whether or not to generate for a given program instruction a trace data element including a traced condition value indicative of the corresponding condition flag. Each control flag may, for example, be used to track whether or not the corresponding condition flag has already been traced since the most recent update of that flag, and hence to determine whether or not that condition flag needs to be traced on execution of a later program instruction.

In one example, the plurality of control flags each have a first state and a second state, said trace circuitry is responsive to an update of any of said plurality of condition flags to place in said first state at least the control flags corresponding to condition flags that have been updated; and said trace circuitry is responsive to said processing circuitry processing one of said at least one conditional instruction that is dependent on a required subset of condition flags to: (a) determine whether any of the corresponding control flags corresponding to said required subset of condition flags are in said first state; and (b) if any of said corresponding control flags are in said first state, generate a trace data element including a traced condition value indicative of at least the condition flags of said required subset whose corresponding control flags are in said first state, and to place said corresponding control flags in said second state.

Hence, when any of the condition flags are updated then at least the control flags corresponding to the updated condition flags are placed in the first state, indicating that the corresponding condition flags have not yet been traced in their updated form. When a conditional instruction is encountered that is dependent on a required subset of the condition flags, then it is determined whether or not any of the corresponding control flags corresponding to that subset are in the first state. If any of these corresponding control flags are in the first state, then this indicates that the corresponding condition flags have not yet been traced and so a trace data element is generated including a traced condition value indicative of at least the condition flags of the required subset whose corresponding control flags are in the first state. When a particular condition flag is traced then its corresponding control flag is placed into the second state. When a conditional instruction is encountered and one of the required subset of condition flags has a corresponding control flag in the second state, then this indicates that the condition flag has already been traced and does not need to be traced again. This technique helps to reduce the amount of trace data by tracing the condition flags which have not yet been traced in their current form and which are required for determining a processing outcome of a particular conditional instruction.

In one embodiment all of the plurality of control flags may be placed in the first state on a condition update, even if only a subset of the condition flags are updated. This can simplify the hardware for implementing the present technique, since then there would be no need to check which flags were actually updated as a result of a condition updating instruction.

In the embodiment where a plurality of control flags are provided, the greatest reduction in the amount of trace data may be achieved by tracing only the condition flags of the required subset whose control flags are in the first state. Nevertheless, it is also possible to trace values of all of the condition flags if any of the corresponding control flags corresponding to the required subset of condition flags are in the first state on execution of a conditional instruction. This can simplify the hardware for reading the state of the condition flags.

The one or more control flags have been described above as being placed in the first state when an update of the condition flags occurs. However, this need not be the only occasion on which the control flags are reset to the first state. Various other events may also cause the control flags to be placed in the first state.

As mentioned above, the present technique need not be applied to all types of conditional instruction. The technique may for example be used for only a subset of conditional instructions. In one example, the conditional operation of the at least one conditional instruction may be a non-branch operation. Some trace circuits may have a separate mechanism for determining results of conditional branch instructions, for example using branch prediction schemes. Therefore, the present technique may in some embodiments only be applied to conditional non-branch instructions with the tracing of conditional branch instructions being handled separately by the trace circuit.

Viewed from another aspect, the present invention provides a processing apparatus comprising:

processing means for performing processing operations in response to program instructions;

condition status storage means for storing at least one condition flag indicating a condition of said processing means; and trace means for generating trace data elements indicative of said processing operations performed by said processing means in response to said program instructions; wherein:

said processing means is responsive to at least one conditional instruction to perform a conditional operation in dependence on a current value of a subset of said at least one condition flag;

and said trace means is configured, in response to said processing means processing at least one selected instruction, to generate a trace data element including a traced condition value indicative of at least said subset of said at least one condition flag, said traced condition value providing information for determining a processing outcome of said at least one conditional instruction.

Viewed from a further aspect, the present invention provides a trace unit for monitoring processing operations performed by a processing apparatus in response to program instructions, said processing apparatus comprising a condition status storage location configured to store at least one condition flag indicating a condition of said processing apparatus, said processing apparatus being responsive to at least one conditional instruction to perform a conditional operation in dependence on a current value of a subset of said at least one condition flag; said trace unit comprising:

trace circuitry configured to generate trace data elements indicative of said processing operations performed by said processing apparatus in response to said program instructions; wherein:

said trace circuitry is configured, in response to said processing apparatus processing at least one selected instruction, to generate a trace data element including a traced condition value indicative of at least said subset of said at least one condition flag, said traced condition value providing information for determining a processing outcome of said at least one conditional instruction.

Viewed from a further aspect, the present invention provides a trace unit for monitoring processing operations performed by a processing apparatus in response to program instructions, said processing apparatus comprising condition status storage means for storing at least one condition flag indicating a condition of said processing apparatus, said processing apparatus being responsive to at least one conditional instruction to perform a conditional operation in dependence on a current value of a subset of said at least one condition flag; said trace unit comprising:

trace means for generating trace data elements indicative of said processing operations performed by said processing apparatus in response to said program instructions; wherein:

said trace means is configured, in response to said processing apparatus processing at least one selected instruction, to generate a trace data element including a traced condition value indicative of at least said subset of said at least one condition flag, said traced condition value providing information for determining a processing outcome of said at least one conditional instruction.

Viewed from yet another aspect, the present invention provides a diagnostic apparatus for analysing trace data indicative of processing operations performed by a processing apparatus in response to program instructions, said processing apparatus comprising a condition status storage location configured to store at least one condition flag indicating a condition of said processing apparatus, said processing apparatus being responsive to at least one conditional instruction to perform a conditional operation in dependence on a current value of a subset of said at least one condition flag; said diagnostic apparatus comprising:

a trace input configured to receive trace data including at least one trace data element generated in response to said processing apparatus processing at least one selected instruction, said at least one trace data element including a traced condition value indicative of at least said subset of said at least one condition flag; and diagnostic circuitry configured to determine a processing outcome of said at least one conditional instruction in dependence on said traced condition value included in said at least one trace data element.

A diagnostic apparatus receives the trace data that was generated by the corresponding trace unit. The diagnostic apparatus has diagnostic circuitry for analysing the trace data. Using the traced condition value indicated in the trace data element, the diagnostic circuitry may determine a processing outcome of the at least one conditional instruction.

The diagnostic apparatus may receive an indication of which instructions were executed by the processing apparatus while it was being traced. This indication may have several forms. It is possible to provide information within the trace stream for indicating which instructions were executed by the processing apparatus. However, a more efficient implementation may be provided by allowing the diagnostic apparatus to either have access to the memory storing the program instructions that were executed (for example by providing the diagnostic apparatus with an instruction address from which the program execution began), or by providing the diagnostic apparatus with a corresponding memory for storing a corresponding copy of the program that was executed by the processing apparatus. The diagnostic apparatus may use this indication of which instructions were executed by the processing apparatus to determine when to expect a trace data element that includes the traced condition value. In one example, in response to an indication of the at least one selected instruction, then the diagnostic apparatus may deduce that a corresponding data element has been included in the trace stream and by locating this data element the diagnostic circuitry may determine a processing outcome of at least one conditional instruction. The selected instruction may be at least one condition update instruction, or at least one of the at least one conditional instruction.

The diagnostic circuitry may be configured to store a diagnostic control flag having a first state and a second state; said trace input may receive an indication of said program instructions processed by said processing apparatus; said diagnostic circuitry may be responsive to an indication of said processing apparatus updating said at least one condition flag to place said diagnostic control flag in said first state; and said diagnostic circuitry may be responsive to an indication of said processing apparatus processing a conditional instruction to: (a) determine whether said diagnostic control flag is in said first state; (b) if said diagnostic control flag is in said first state, locate in said trace data an associated trace data element for said conditional instruction and determine said processing outcome of said conditional instruction in dependence on said traced condition value included in said associated trace data element, and place said diagnostic control flag in said second state; and (c) if said diagnostic control flag is in said second state, locate in said trace data a further trace data element associated with a previous conditional instruction, and determine said processing outcome of said conditional instruction in dependence on said traced condition value included in said further trace data element.

Thus, the diagnostic circuitry may maintain a diagnostic control flag corresponding to the control flag used by the trace unit when generating the trace stream. When the diagnostic circuitry receives an indication of a program instruction executed by the processing circuit which resulted in an update of the at least one condition flag (the indication may be an explicit indication of a condition update in the trace stream, or an implicit indication arising when the diagnostic circuitry encounters a condition updating instruction while processing the trace stream, for example), then the diagnostic apparatus places its diagnostic control flag in the state, indicating that the next time an indication of a conditional instruction is found then the diagnostic circuitry should expect the trace stream to include an associated trace data element including a traced condition value.

When the diagnostic circuitry receives an indication of the processing apparatus processing a conditional instruction, then the diagnostic apparatus determines whether or not the diagnostic control flag is in the first state, and if the diagnostic control flag is in the first state then the diagnostic apparatus locates the associated trace data element for that conditional instruction and determines the processing outcome of the conditional instruction in dependence on the traced condition value included in the associated trace data element. The diagnostic apparatus then places the diagnostic control flag in the second state, indicating that the outcome of any subsequent conditional instructions may be deduced from the traced condition value included in the associated trace data element. Then, if an indication of a conditional instruction is detected when the diagnostic control flag is in the second state, then the diagnostic apparatus can go back to the trace data element that was associated with a previous conditional instruction and determine the processing outcome of the latest conditional instruction in dependence on the traced condition value that was included in the earlier trace data element. This technique allows the diagnostic apparatus to determine the outcomes of the processing operations in a corresponding way to the technique performed by the trace circuit.

If the condition status storage location of the processing apparatus stores a plurality of condition flags corresponding to respective conditions of said processing apparatus, then the diagnostic circuitry may be configured to store a plurality of diagnostic control flags corresponding to said plurality of condition flags, said plurality of diagnostic control flags each having a first state and a second state; said trace input may receive an indication of said program instructions processed by said processing apparatus; said diagnostic circuitry may be responsive to an indication of said processing apparatus updating any of said plurality of condition flags to place in said first state at least the control flags corresponding to condition flags that have been updated; and said diagnostic circuitry may be responsive to an indication of said processing apparatus processing a condition instruction that is dependent on a required subset of condition flags to: (a) determine whether any of the corresponding diagnostic control flags corresponding to said required subset of condition flags are in said first state; (b) if at step (a) any of said corresponding diagnostic control flags are in said first state, locate in said trace data an associated trace data element for said conditional instruction, said associated trace data element including a first traced condition value indicative of at least the condition flags whose corresponding diagnostic control flags are in said first state, and place said corresponding diagnostic control flags in said second state; (c) if at step (a) any of said corresponding diagnostic control flags are in said second state, to locate in said trace data at least one further trace data element for at least one previous conditional instruction, said at least one further trace data element including at least one further traced condition value indicative of at least the condition flags whose corresponding diagnostic control flags are in said second state; and (d) determine said processing outcome of said conditional instruction in dependence on at least one of said first traced condition value and said at least one further traced condition value.

This algorithm corresponds to the algorithm of the trace unit in which separate condition control flags are provided corresponding to the respective condition flags. The diagnostic circuitry is able to determine from the diagnostic control flags whether or not the trace stream includes a trace element for a given conditional instruction, indicating values of the relevant subset of condition flags, or whether it is necessary to go back to one or more further trace data elements for earlier conditional instructions to determine the required condition flag values. The processing outcome of the current conditional instruction may be determined in dependence on one or both of the traced condition value included in the trace data element for the current conditional instruction and the traced condition value included in at least one earlier trace data element for an earlier conditional instruction.

Viewed from another aspect, the present invention provides a diagnostic apparatus for analysing trace data elements indicative of processing operations performed by a processing apparatus in response to program instructions, said processing apparatus comprising condition status storage means for storing at least one condition flag indicating a condition of said processing apparatus, said processing apparatus being responsive to at least one conditional instruction to perform a conditional operation in dependence on a current value of a subset of said at least one condition flag; said diagnostic apparatus comprising:

input means for receiving a trace data element generated in response to said processing apparatus processing at least one selected instruction, said trace data element including a traced condition value indicative of at least said subset of said at least one condition flag; and diagnostic means for determining a processing outcome of said at least one conditional instruction in dependence on said traced condition value included in said trace data element for said at least one selected instruction.

Viewed from a further aspect, the present invention provides a method of data processing comprising steps of:

in response to program instructions, performing processing operations using a processing apparatus;

storing at least one condition flag indicating a condition of said processing apparatus; and generating trace data elements indicative of said processing operations; wherein:

said step of performing processing operations includes performing, in response to at least one conditional instruction, a conditional operation in dependence on a current value of a subset of said at least one condition flag; and said step of generating trace data elements includes generating, in response to at least one selected instruction, a trace data element including a traced condition value indicative of at least said subset of said at least one condition flag, said traced condition value providing information for determining a processing outcome of said at least one conditional instruction.

Viewed from yet another aspect, the present invention provides a method for analysing trace data elements indicative of processing operations performed by a processing apparatus in response to program instructions, said processing apparatus comprising a condition status storage location configured to store at least one condition flag indicating a condition of said processing apparatus, said processing apparatus being responsive to at least one conditional instruction to perform a conditional operation in dependence on a current value of a subset of said at least one condition flag; said method comprising steps of:

receiving a trace data element generated in response to said processing apparatus processing at least one selected instruction, said trace data element including a traced condition value indicative of at least said subset of said at least one condition flag; and determining a processing outcome of said at least one conditional instruction in dependence on said traced condition value included in said trace data element for said at least one selected instruction.

A computer program may be provided for controlling a computer to perform the method of analysing trace data elements described above. The computer program may be provided on a non-transitory storage medium.

Viewed from a further aspect, the present invention provides a processing apparatus comprising processing circuitry configured to perform processing operations in response to program instructions; and trace circuitry configured to generate trace data elements indicative of said processing operations performed by said processing circuitry in response to said program instructions; wherein:

said processing circuitry is responsive to at least one conditional instruction to perform a conditional operation in dependence on a condition of said processing circuitry;

said trace circuitry is configured to store a control flag having a first state and a second state;

said trace circuitry is responsive to an update of said condition of said processing circuitry to place said control flag in said first state; and said trace circuitry is responsive to said processing circuitry processing one of said at least one conditional instruction to: (a) determine whether said control flag is in said first state; and (b) if said control flag is in said first state, generate a trace data element including an outcome indicating value for providing information on a processing outcome of said at least one conditional instruction and place said control flag in said second state.

The control algorithm described above for determining whether or not to trace the condition flag values for a given conditional instruction may be extended to apply to the tracing of any outcome indicating value which provides information for determining a processing outcome of the conditional instruction. For example, the outcome indicating value may include the traced condition value as described above, but may also include other kinds of outcome indicating value such as a pass/fail result of the conditional instruction. By using this algorithm, the amount of trace data is reduced because the outcome indicating value is included for the first conditional instruction following an update of the condition of the processing circuitry, but is not included for subsequent instructions for which the processing outcome can be determined using trace data generated for a previous instruction.

Viewed from another aspect, the present invention provides processing apparatus comprising:

processing means for performing processing operations in response to program instructions; and trace means for generating trace data elements indicative of said processing operations performed by said processing means in response to said program instructions; wherein:

said processing means is responsive to at least one conditional instruction to perform a conditional operation in dependence on a condition of said processing means;

said trace means is configured to store a control flag having a first state and a second state;

said trace means is responsive to an update of said condition of said processing means to place said control flag in said first state; and said trace means is responsive to said processing means processing one of said at least one conditional instruction to: (a) determine whether said control flag is in said first state; and (b) if said control flag is in said first state, generate a trace data element including an outcome indicating value for providing information on a processing outcome of said at least one conditional instruction, and place said control flag in said second state.

Viewed from another aspect, the present invention provides a method of data processing comprising steps of:

in response to program instructions, performing processing operations using a processing apparatus, said performing processing operations including performing, in response to at least one conditional instruction, a conditional operation in dependence on a condition of said processing circuitry; and generating trace data elements indicative of said processing operations, said trace data elements being generated in dependence on a control flag having a first state and a second state;

wherein said step of generating trace data elements includes:

in response to an update of said condition of said processing circuitry, placing said control flag in said first state; and in response to processing of one of said at least one conditional instruction, (a) determining whether said control flag is in said first state; and (b) if said control flag is in said first state, generating a trace data element including an outcome indicating value for providing information on a processing outcome of said at least one conditional instruction, and placing said control flag in said second state.

The above, and other objects, features and advantages of this invention will be apparent from the following detailed description of illustrative embodiments which is to be read in connection with the accompanying drawings.

BRIEF DESCRIPTION OF THE DRAWINGS

FIG. 2 illustrates examples of condition flags and condition states used in the processors designed by ARM Limited of Cambridge, UK;

FIG. 3 illustrates an example of identifiers for identifying particular sets of values of the condition flags;

FIG. 6 illustrates an example of a trace stream generated in the method of FIG. 4 and an example of the analysis of the trace stream according to the method of FIG. 5;

FIG. 7 illustrates an example of a sequence of program instructions in which multiple condition updating instructions occur in succession without any intervening conditional instructions;

FIG. 10 illustrates an example of a trace stream generated in the method of FIG. 8 and an example of the analysis of the trace stream according to the method of FIG. 9;

FIG. 13 illustrates an example of generating a trace stream using the method of FIG. 11 and an example of analysing the trace stream using the method of FIG. 12.

DESCRIPTION OF NON-LIMITING EXAMPLE EMBODIMENTS

Figure 1:
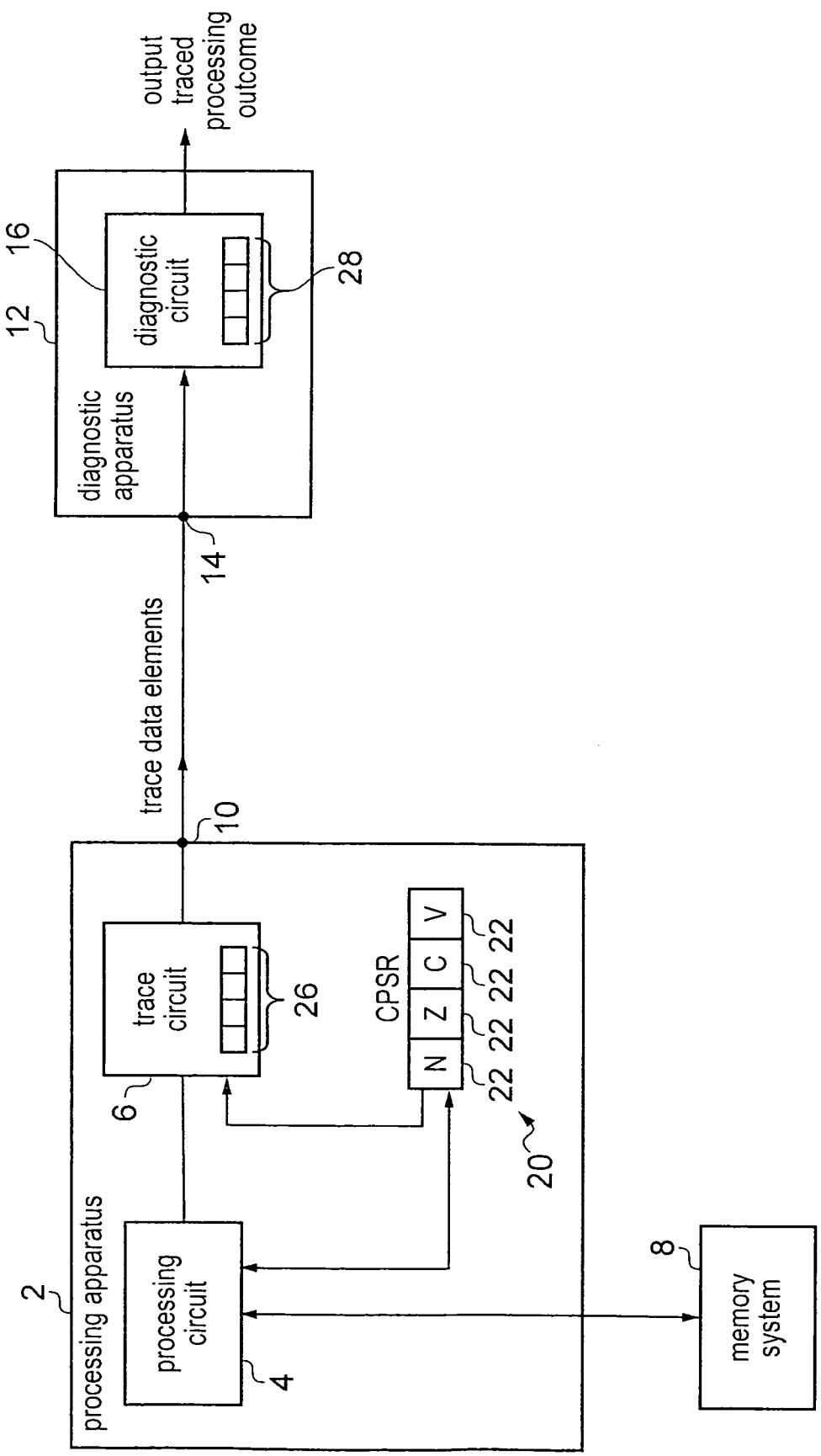
FIG. 1 schematically illustrates a processing apparatus, trace circuit and diagnostic apparatus.

FIG. 1 illustrates a processing apparatus 2 comprising a processing circuit 4 for performing processing operations in response to program instructions. The processing apparatus 2 is provided with a memory system 8 which comprises one or more cache units or memory units for storing program instructions to be executed by the processing circuit 4 and/or data to be processed by the processing circuit 4.

The processing apparatus 2 includes a trace circuit 6 for monitoring the processing operations performed by the processing circuit 4. The trace circuit 6 generates trace data elements indicating characteristics of the processing operations performed by the processing circuit 4. The trace circuit 6 outputs the generated trace data elements over an output port 10. The trace circuit 6 need not be implemented on the same integrated circuit as processing circuit 4 and in some embodiments may be provided as a separate trace unit.

A diagnostic apparatus 12 is provided for analysing the trace data elements generated by the trace circuit 6. The diagnostic apparatus 12 receives the trace data elements over an input port 14. The diagnostic apparatus 12 also receives an indication of which program instructions were executed by the processing circuit 4. This indication may be provided by the trace circuit 6 indicating in the trace stream which instructions were executed. Alternatively, the diagnostic apparatus 12 may be provided with an address indicating the location within the memory system 8 of the first program instruction that was executed by the processing circuit 4. The diagnostic apparatus 12 may also be provided with a memory (not illustrated in FIG. 1) for storing a corresponding copy of the program that was executed by the processing circuit 4. The diagnostic apparatus 12 analyses step-by-step the instructions that were executed by the processing circuit 4, and determines processing outcomes of the instructions based on the information included in the stream of trace data elements.

The trace data elements need not be output directly from the trace circuit 6 to the diagnostic apparatus 12 but may be, for example, stored in a memory or other storage device and then accessed from the storage device by the diagnostic apparatus 12 when desired. The diagnostic apparatus 12 may be, for example, a general purpose computer programmed to execute a trace analysis method.

The processing apparatus 2 has a storage location, for example a condition status register (CPSR) 20, for storing one or more condition flags 22 indicating respective conditions of the processing apparatus 2. In the processors designed by ARM Limited of Cambridge, UK, the condition flags 22 may include NZCV (Negative, Zero, Carry, oVerflow) flags for indicating whether a processing result is negative, zero, required a carry, or caused an overflow. FIG. 2 illustrates various condition states which can be indicated by different combinations of the condition flags 22 in the condition status register 20.

It will be appreciated that the storage location for storing the condition flags 22 need not be a condition status register 20 but may also be a storage location within the memory system 8, or any other kind of storage location.

The processing circuit 4 may be responsive to at least one condition updating instruction to update one or more of the condition flags 22 in the condition status register 20. For example, a compare instruction may compare two data values and update the flags in dependence on the comparison, for example to indicate whether the values were equal or whether one value was less than or greater than the other value. Any instruction which causes the condition flags 22 to be updated may be considered to be a condition updating instruction. For example, in the ARM instruction set architecture, the TST, TEQ, CMP and CMN instructions are examples of condition updating instructions.

The processing circuit 4 may also be responsive to at least one conditional instruction which is associated with a given condition. When a conditional instruction is executed, then the values of the condition flags 22 are compared with the given condition. If the condition flags 22 satisfy the condition, then an associated processing operation is performed. If the condition is not satisfied, then the associated processing operation is not performed (alternatively, for some kinds of conditional instruction a different processing operation to the associated processing operation may be performed if the condition is not satisfied).

For example, a conditional add instruction ADDEQ is associated with the EQ condition. FIG. 2 indicates that the EQ condition is satisfied if the Z flag is set. When the conditional add instruction ADDEQ is executed, then if the Z flag is set then the associated add operation will be performed, while if the Z flag is not set then the add operation will not be performed.

The processing outcome of the conditional instruction cannot be determined from the instruction stream alone, since the instruction stream contains no information for determining whether the condition was satisfied. Therefore, the trace circuit 6 is responsive to at least one selected instruction to generate a trace data element including a traced condition value indicative of the values of the condition flags 22. The diagnostic apparatus 12 can use the traced condition value included in the trace data element to determine whether the condition was satisfied, and therefore can determine the processing outcome of the corresponding conditional instruction.

The trace circuit 6 maintains one or more control flags 26 for monitoring whether or not the values of the condition flags 22 have been traced. The trace circuit 6 may select whether or not to trace the condition flag values on execution of a given instruction based on the current values of the one or more control flags 26. In one embodiment, the trace circuit 6 includes a single control flag 26 (see the embodiment of FIGS. 8-10 as described below), while in another embodiment the trace circuit 6 includes multiple control flags 26 each corresponding to one of the condition flags 22 (see the embodiment described below with respect to FIGS. 11-13).

The diagnostic circuit 16 maintains a corresponding set of control flags 28, which are used in a corresponding way to the control flags 26 of the trace circuit 6 to determine whether or not a trace data element including a traced condition value is expected to be provided in the trace stream for a given program instruction.

The traced condition value within the trace data elements may be indicated in different ways. In one example, the trace circuit 6 may include the actual values of at least a subset of the condition flags 22 in the trace data element. Where a conditional instruction is dependent on only a subset of the condition flags 22, then the trace circuit 6 may include just the relevant subset of condition flag values, or may include all of the condition flags 22.

Alternatively, the trace circuit 6 may include in the trace data element an identifying code indicating a particular combination of values of the condition flags 22. This may provide an efficient encoding if some combinations of condition values are more common than others. For example, FIG. 3 shows an example in which a 2-bit identifier is used for three of the condition states (for example the state in which the C flag is set, the state in which the N flag is set, and the state in which the Z and C flags are set). A 4-bit identifier is then used for three more of the different condition states. If one of the other combinations of condition flag values is required then a separate indication of the current condition flag values may be provided in the trace data element, using a different encoding to the scheme shown in FIG. 3.

It will be appreciated that the encoding of the identifiers, and the selection of which condition states are represented by a particular identifier, is only an example. Nevertheless, this example demonstrates that the total amount of trace data can be reduced by allocating the identifiers having the fewest bits to the condition states which arise most frequently. For example, if the processing apparatus 2 is in one of the three condition states having a 2-bit identifier for 70% of the time, in one of the three states having a 4-bit identifier for 29% of the time, and in one of the other states for 1% of the time (and those other states are represented by an 8-bit identifier, say), then the average number of bits used to identify the current condition state would be 2*0.7+4*0.29+8*0.01=2.64 (the asterisk * indicates a multiply sign). Hence, the average number of bits included in the trace stream to indicate the current condition state would be less than the 4 bits that would be used if the trace data element simply included the current values of the condition flags.

The trace circuit 6 may trace the values of the condition flags 22 at different instructions of the program being executed by the processing circuit 4. The trace circuit 6 may select one or more selected instructions for triggering generation of a trace data element including condition flag indicating values. The selected instruction may be a conditional instruction, but may also be another instruction.

Figure 4:
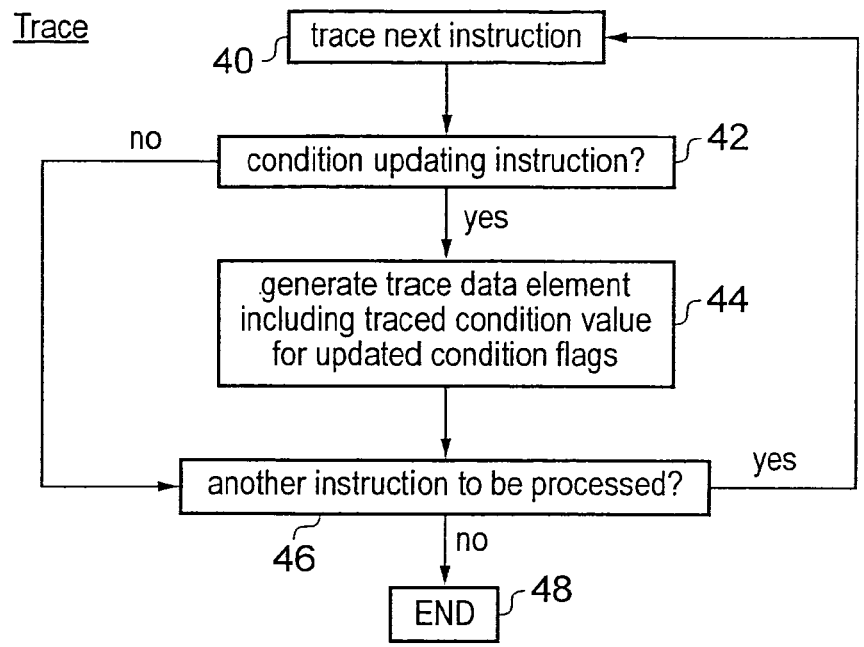
FIG. 4 illustrates a method of tracing the values of condition flags upon execution of a condition updating instruction.
Figure 5:
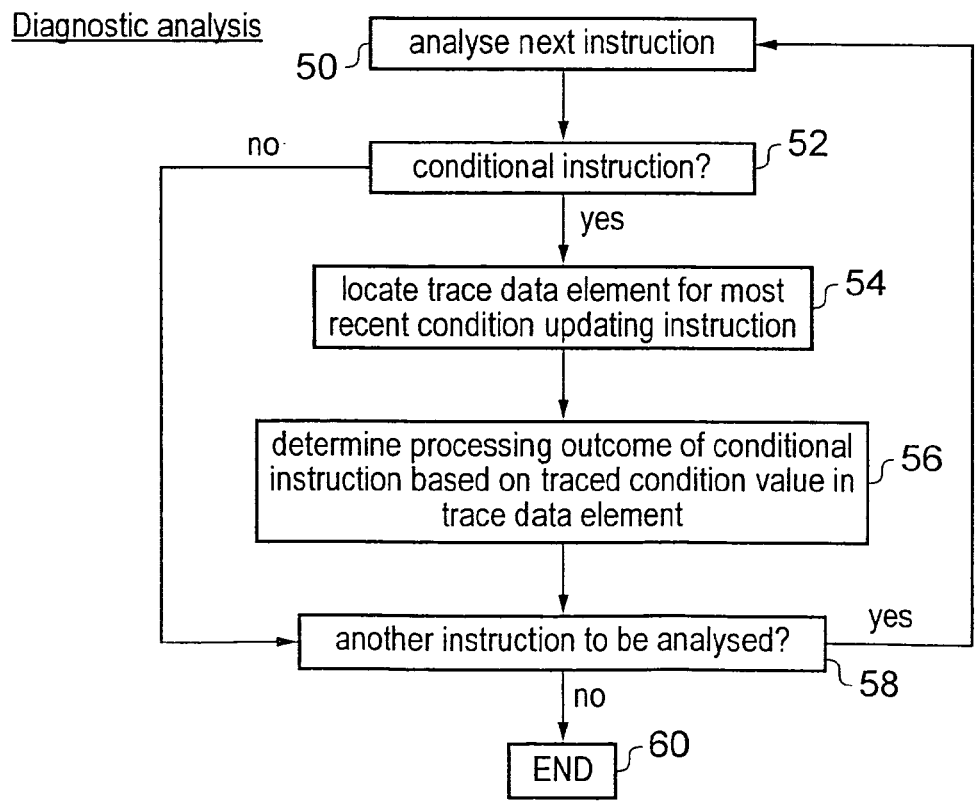
FIG. 5 illustrates a corresponding method of analysing trace data generated in the method of FIG. 4.

For example, FIGS. 4-6 show an example in which a trace data element including a traced conditional value is generated upon execution of a condition updating instruction. FIG. 4 shows a method of generating trace data in response to operations of the processing circuit 4. At step 40, the processing circuit 4 processes a next instruction of the program being executed, and the trace circuit 6 monitors the processing of that instruction by the processing circuit 4. At step 42, the trace circuit 6 determines whether or not the instruction being executed by the processing circuit 4 is a condition updating instruction. If the instruction is a condition updating instruction, then at step 44 the trace circuit 6 generates and outputs a trace data element including a traced condition value indicating the updated value of the condition flags 22 resulting from execution of the condition updating instruction. On the other hand, if the instruction was not a condition updating instruction then step 44 is omitted. At step 46, it is determined whether or not there is another instruction to be processed by the processing circuit 4. If there is another instruction, then the method returns to step 40, while otherwise if there are no instructions left then the method ends at step 48.

FIG. 5 illustrates a corresponding diagnostic method for analysing the trace stream produced by the trace circuit 6 using the method of FIG. 4. The diagnostic apparatus 12 receives an indication of which instructions were executed by the processing circuit 4. At step 50, the diagnostic circuit 16 analyses a next instruction indicated as being executed by the processing circuit 4. At step 52, the diagnostic circuit 16 determines whether or not the next instruction is a conditional instruction. If the instruction is a conditional instruction, then at step 54 the diagnostic circuit 16 locates in the trace data stream a trace data element associated with the most recent condition updating instruction that was indicated in the indication of program instructions. At step 56 the diagnostic circuit 16 determines the processing outcome of the conditional instruction based on the traced condition value included in the located trace data element. For example, the diagnostic circuit 16 can use the traced condition value to determine whether or not the condition associated with the conditional instruction was satisfied and accordingly whether or not the associated operation was performed or not. If at step 52 the next instruction was determined not to be a conditional instruction then steps 54 and 56 are omitted. At step 58, it is determined whether or not there is another instruction to be analysed. If there is another instruction, then the method returns to step 50, while if there are no more instructions then the method ends at step 60.

FIG. 6 illustrates an example of the generation of a trace stream according to the method of FIG. 4 and the analysis of the trace stream according to the method of FIG. 5. FIG. 6 shows a set of program instructions that were executed by the processing circuit 4. When a branch instruction is executed then a trace data element is generated indicating whether or not the branch was taken. When a condition updating instruction (e.g. CMP) is encountered, then according to step 44 of FIG. 4 a trace data element is generated including a traced condition value CPSR. When analysing the trace stream, then the diagnostic apparatus can use the traced condition value to determine the processing outcomes of any following conditional instructions (for example, the instructions MOVNE, MOVEQ, and ADDHI shown in FIG. 6).

Some instructions may be both a condition updating instruction and a conditional instruction. For example, the program instruction at memory location 2100 in FIG. 6 is a conditional compare instruction CCMPNE for controlling the processing circuit 4 to determine whether or not the current values of the condition flags 22 satisfy the not equal (NE) condition (see FIG. 2). If the not equal condition is satisfied, then the processing circuit 4 performs a comparison operation and updates the condition flags 22 based on the comparison result. As the CCMPNE instruction is a conditional instruction, then the diagnostic circuit 16 determines the processing outcome of the CCMPNE instruction based on the traced condition value included in the trace stream at the most recent update of the condition flags (i.e. the CPSR value included for the compare instruction CMP at memory location 2000). If the NE condition is satisfied upon execution of the CCMPNE instruction, then the CCMPNE instruction is also a condition updating instruction and so the trace circuit 6 generates a trace data element for instruction CCMPNE including a traced condition value indicating the updated values of the condition flags 22. This trace data element can the be used for determining the outcomes of any subsequent conditional instructions.

Alternatively, in some examples the CCMPNE instruction may be considered as a condition updating instruction regardless of whether the NE condition was satisfied, and thus a trace data element indicating the values of the condition flags could always be generated for the CCMPNE instruction. This could be useful if the NE condition has not yet been calculated at the time of tracing.

The technique shown in FIGS. 4-6 can be useful when a single condition updating instruction is followed by a chain of conditional instructions all dependent on the same set of condition values, because in this case a small amount of trace data is sufficient to determine the outcomes of several following instructions.

However, in some situations there may be many condition updating instructions which occur in succession without any intervening conditional instructions which use the updated values of condition flags. For example, in FIG. 7 a sequence of program instructions includes a number of compare CMP and bit test TST instructions which result in a condition flag update, but the first four of these instructions update the flags without those updated values ever being used by a conditional instruction. In such a situation it can be more efficient to generate the trace data element including the traced condition value upon execution of a conditional instruction (for example, as described below with reference to FIGS. 8-10 and 11-13). In the example shown in FIG. 7 then the trace data element could be generated when the conditional instruction MOVNE is executed, rather than on each condition update.

It will be appreciated that a mixture of these techniques may be possible and so some trace units may generate traced condition values both on execution of a condition updating instruction and on execution of a conditional instruction.

Figure 8:
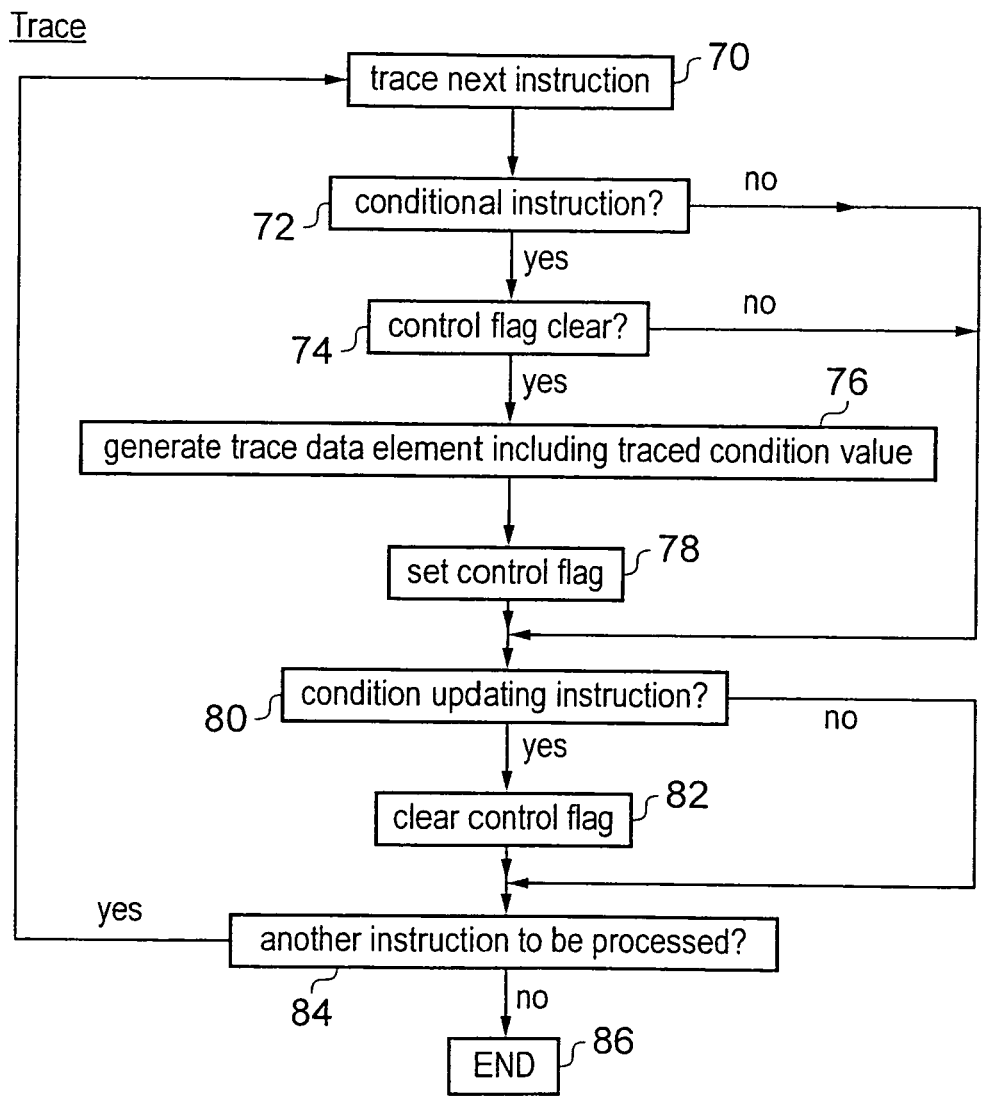
FIG. 8 illustrates a method of tracing the values of the condition flags upon execution of a conditional instruction.

FIG. 8 shows a trace method in which the condition flags 22 are traced on execution of a conditional instruction. In this embodiment, the trace circuit 6 maintains a control flag 26 for determining whether or not to trace the values of the condition flags 22. The control flag 26 has a "clear" state and a "set" state (for example, the "clear" state may be the control flag 26 having a 0 value and the "set" state may be the control flag 26 having a 1 value, or vice versa).

At step 70 of FIG. 8, the trace circuit 6 monitors the processing circuit 4 executing a next instruction. At step 72, the trace circuit 6 determines whether or not that instruction is a conditional instruction. If the instruction is a conditional instruction, then at step 74 the trace circuit 6 determines whether or not the control flag is clear. If the control flag is clear, then at step 76 the trace circuit 6 generates and outputs a trace data element including a traced condition value which indicates the current state of the condition status register 20. Then, at step 78 the control flag is set. On the other hand, if at step 74 the control flag was set, then steps 76 and 78 are omitted. If at step 72 the instruction was determined not to be a conditional instruction; then steps 74 to 78 are omitted.

Then, at step 80, it is determined whether or not the next instruction is a condition updating instruction. Note that some instructions may be both a conditional instruction and a condition updating instruction. If the instruction is a condition updating instruction, then at step 82 the control flag is cleared. Otherwise, step 82 is omitted. Then at step 84, it is determined whether or not there is another instruction to be processed by the processing circuit 4. If there is another instruction, then the method returns to step 70. If there are no more instructions, then the method ends at step 86.

Some pseudocode for implementing the method of FIG. 8 is indicated below (the term "marker" indicates the control flag 26):
On an instruction:
If instruction is conditional:
If marker is clear:
Trace the CPSR
Set marker
If instruction updates the CPSR:
Clear marker The method of FIG. 8 helps to reduce the amount of trace data since the trace circuit 6 generates a trace data element including a traced condition value on the first conditional instruction which occurs following a condition updating instruction. For subsequent conditional instructions then there is no need to trace the condition value because a previous conditional instruction already has an associated trace data element which contains information indicating the state of the condition flags 22.

Figure 9:
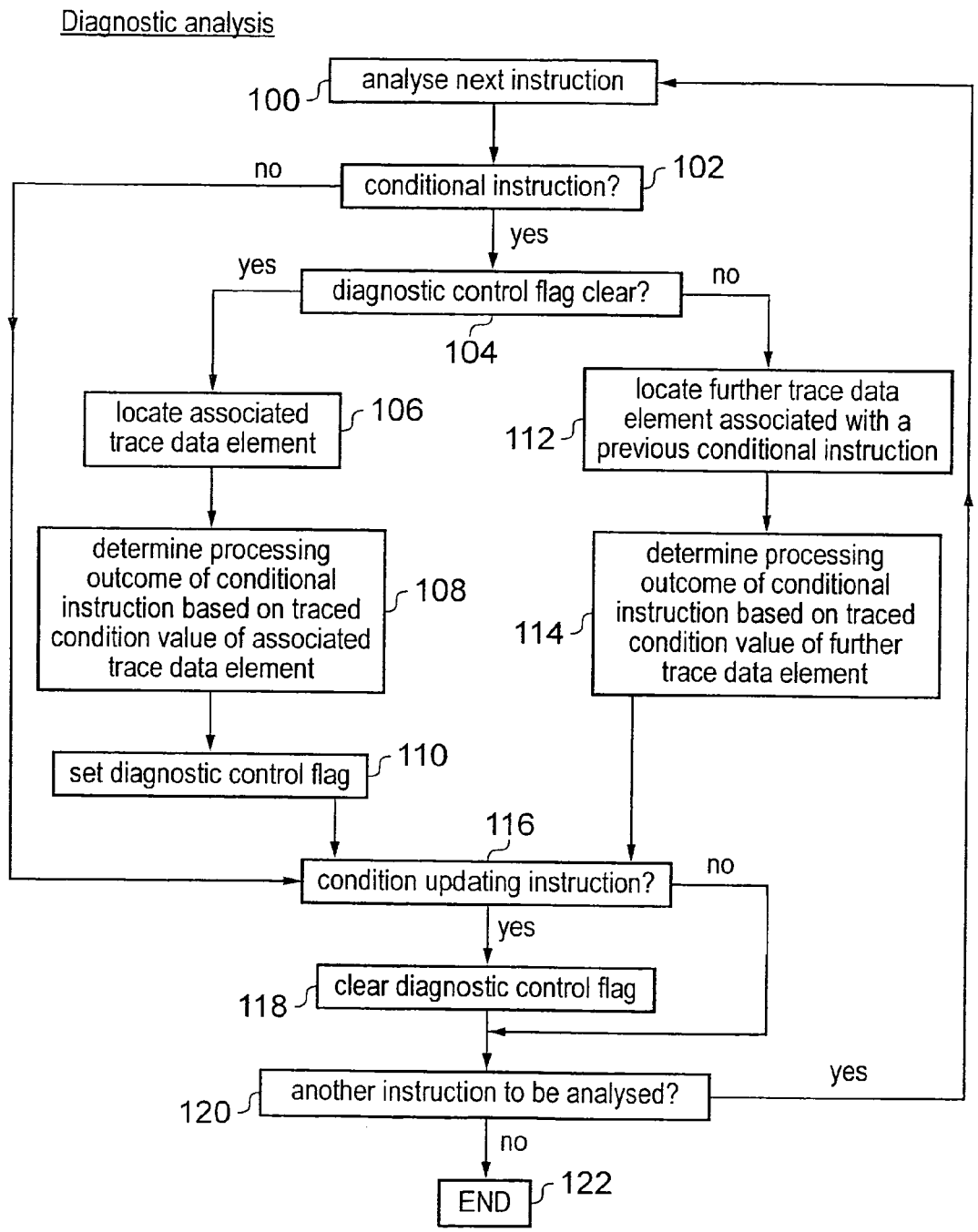
FIG. 9 illustrates a corresponding method of analysing trace data produced in the method of FIG. 8.

FIG. 9 shows a corresponding diagnostic method for analysing the trace stream produced in the method of FIG. 8. The diagnostic apparatus 12 has a control flag 28 having "clear" and "set" states corresponding to the states of the control flag 26 of the trace circuit 6. At step 100, the diagnostic circuit 16 analyses the next instruction included in the indication of the program instructions processed by the processing circuit 4. At step 102, it is determined whether or not there is an indication of a conditional instruction. If the instruction is a conditional instruction, then at step 104 it is determined whether or not the diagnostic control flag 28 is clear. If the diagnostic control flag is clear, then at step 106 the diagnostic circuit 16 locates an associated trace data element for that conditional instruction and at step 108 determines a processing outcome of the conditional instruction based on the traced condition value included in the associated trace data element. At step 110, the diagnostic control flag is placed in the "set" state.

On the other hand, if at step 104 the diagnostic control flag was not clear, then the method proceeds to step 112 at which a further trace data element is located by the diagnostic circuit 16. The further trace data element is a data element associated with a previously analysed conditional instruction. At step 114, the diagnostic circuit 16 determines the processing outcome of the currently analysed conditional instruction based on the traced condition value included in the further trace data element generated for the previously analysed conditional instruction. If at step 102, the instruction was determined not to be a conditional instruction, then steps 104 to 114 are omitted.

Then, at step 116 it is determined whether or not the instruction being analysed is a condition updating instruction. The instruction may be both a conditional instruction and a condition updating instruction. If the instruction is a condition updating instruction then at step 118 the diagnostic control flag 28 is cleared, while if the instruction is not a condition updating instruction then step 118 is omitted. At step 120, it is determined whether or not there is another instruction to be analysed. If there is another instruction, then the method returns to step 100, while otherwise the method ends at step 122.

Thus, the diagnostic circuit uses a diagnostic control flag 28 corresponding to the control flag 26 of the trace circuit 6 to determine whether or not an associated trace data element is expected to be included in the trace stream for a given conditional instruction. If there is such an associated trace data element then the processing outcome of the conditional instruction can be determined based on the traced condition value included in the associated trace data element. If there is no associated trace data element, then there will be a trace data element associated with a previous conditional instruction that will contain a traced condition value enabling the processing outcome of the current conditional instruction to be determined. When a condition updating instruction is encountered, then the diagnostic control flag 28 is cleared to indicate that the next conditional instruction will be expected to have an associated trace data element.

FIG. 10 illustrates an example of the application of the method of FIGS. 8 and 9 to the stream of program instructions shown in FIG. 6. Again, the branch taken result of the branch instruction at memory location 1600 is traced. In response to execution of the condition updating instruction CMP stored at memory location 2000, then the trace circuit 6, according to step 82 of FIG. 8, clears its control flag 26. In a similar way, when the diagnostic circuit 16 analyses the instructions then it will respond to an indication of the condition updating instruction CMP by clearing its diagnostic control flag 28, according to step 118 of FIG. 9.

When the trace circuit 6 encounters the conditional instruction MOVNE stored at memory location 2004, then the trace circuit 6 determines that the control flag 26 is currently in the cleared state, and so at step 76 of FIG. 8 a trace data element is generated including a traced condition value CPSR. The control flag is then set, according to step 78 of FIG. 8. In a corresponding way, when analysing the instructions, the diagnostic circuit 16 will detect an indication of the conditional instruction MOVNE at memory location 2004 and will then respond to the diagnostic control flag 28 being clear by locating the associated trace data element in the trace stream and determining the processing outcome of the MOVNE instruction based on the traced condition value included in the trace data element. The diagnostic circuit 16 then sets the diagnostic control flag 28 at step 110 of FIG. 9.

Then, for subsequent conditional instructions at memory locations 2008 and 200C, the trace circuit 6 detects that the control flag 26 is in the set state, and so does not generate a corresponding trace data element. In a corresponding way, the diagnostic circuit 16 detects that the diagnostic control flag 28 is in the set state, and so following steps 112 and 114 of FIG. 9 locates the trace data element associated with the previous conditional instruction stored at memory location 2004. The diagnostic circuit 16 determines the processing outcome of the instructions at memory locations 2008 and 200C based on the previous trace data element for the instruction at memory location 2004.

In this way, a trace stream can be generated in which the first conditional instruction to be executed following an update of the condition flags 22 triggers generation of a trace data element including a traced condition value.

Figure 11:
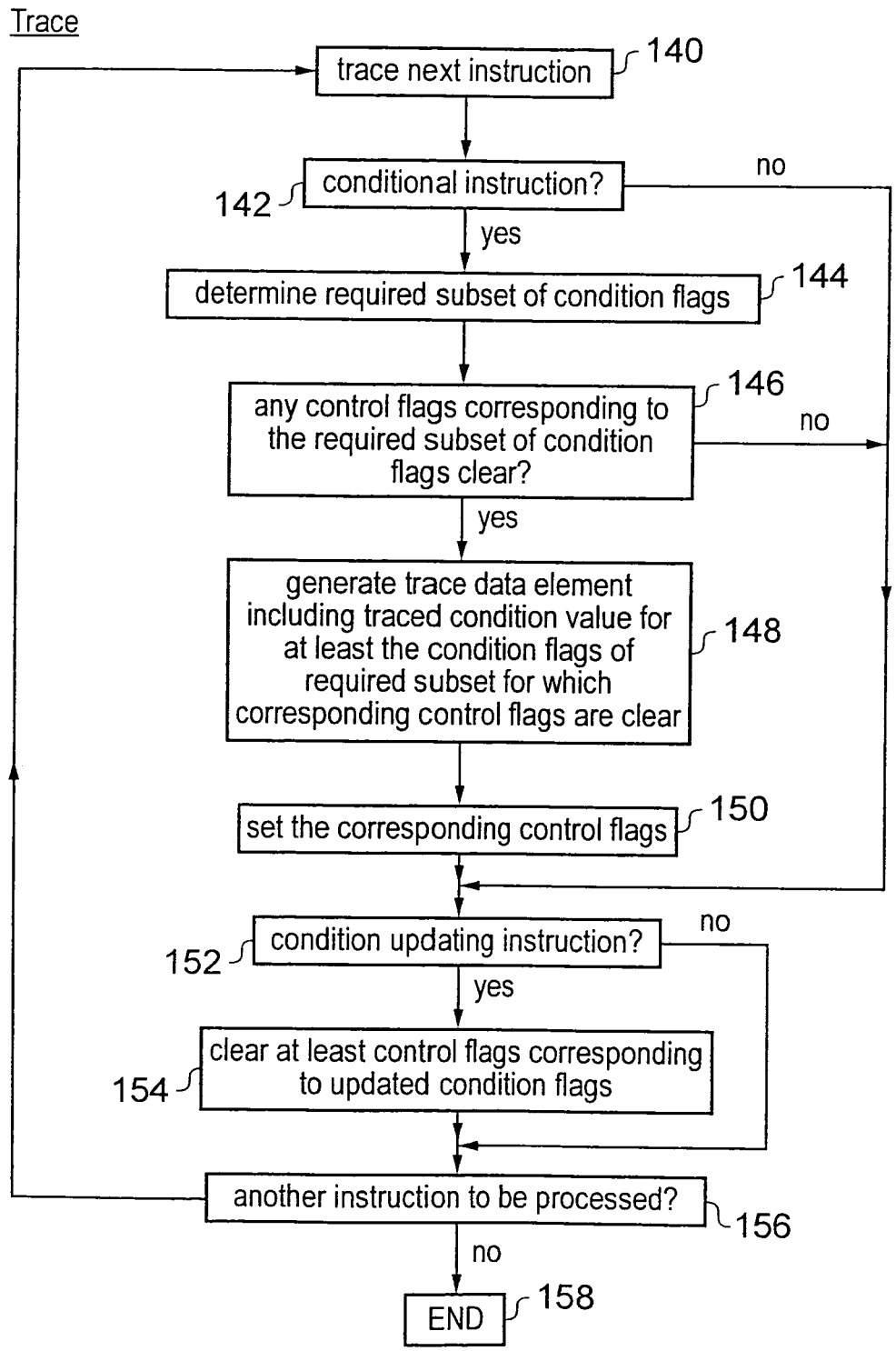
FIG. 11 illustrates a method of tracing the values of at least a required subset of condition flags upon execution of a conditional instruction.
Figure 12:
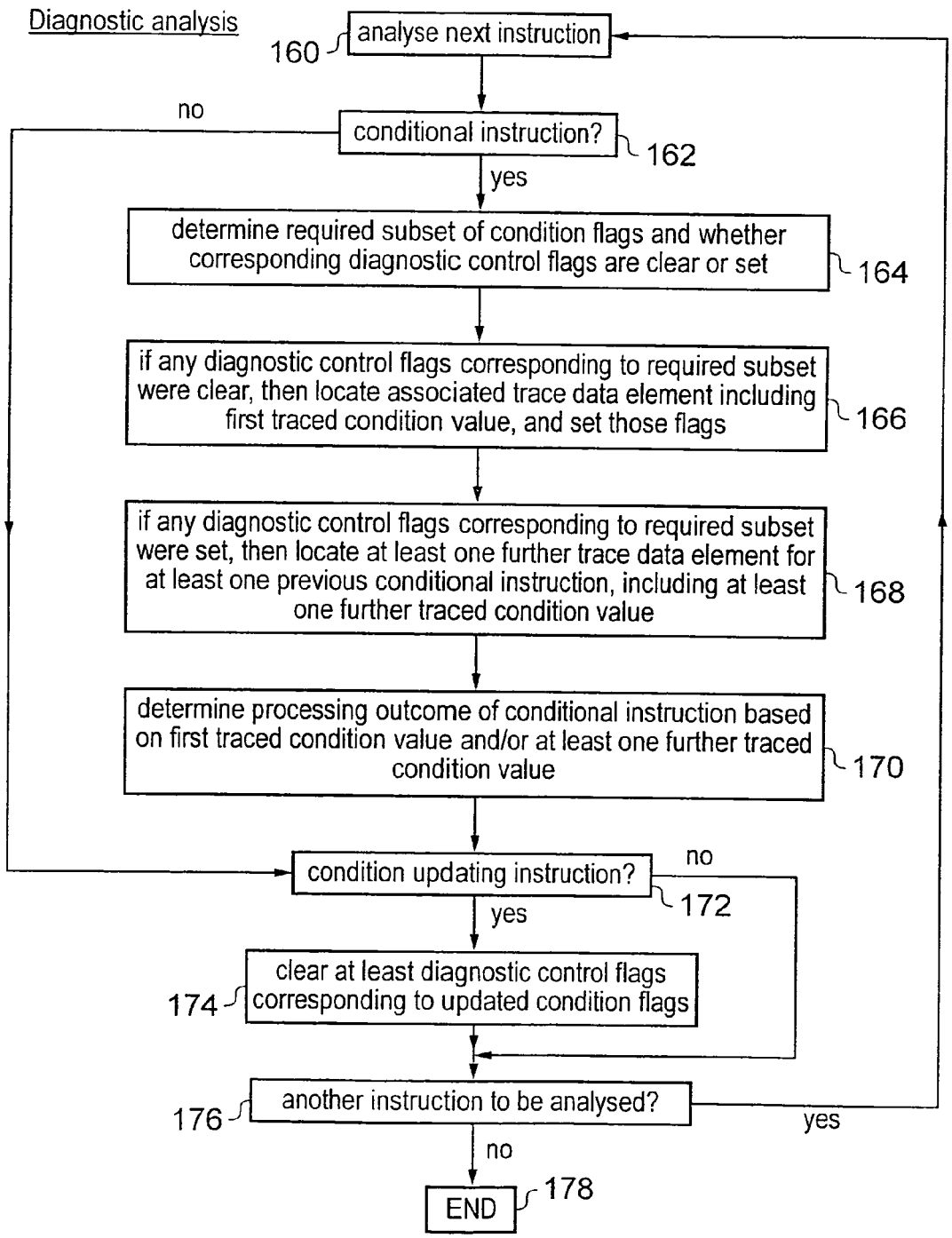
FIG. 12 illustrates a corresponding method of analysing trace data generated in the method of FIG. 11.

FIGS. 11-13 show an embodiment in which the trace circuit 6 monitors which condition flags 22 have already been traced, and when generating a trace data element for a conditional instruction traces the additional condition flags required by that conditional instruction which have not already been traced. This method makes use of a plurality of control flags 26 each corresponding to a respective one of the condition flags 22. Each control flag 26 has a "clear" state and a "set" state. The diagnostic circuit 16 has a corresponding group of diagnostic control flags 28 also having a "clear" state and a "set" state.

FIG. 11 illustrates a method of tracing the operations of the processing circuit 4. At step 140, the processing circuit 4 executes a next instruction and the execution of this instruction is monitored by the trace circuit 6. At step 142, it is determined whether or not the instruction is a conditional instruction. If the instruction is a conditional instruction, then at step 144 the trace circuit 6 determines the subset of the condition flags 22 that is required for determining the outcome of the conditional instruction. For example, for each condition shown in FIG. 2, the corresponding flags indicated in the table are the required subset of condition flags. The HI condition, for example, requires the C and Z flags.

At step 146, the trace circuit 6 determines whether any of the control flags 26 corresponding to the required subset of condition flags 22 are clear. If none of the control flags corresponding to the required subset of condition flags are clear, then the method proceeds to step 152. If any one or more of the control flags that correspond to the required subset of condition flags are clear, then at step 148 the trace circuit 6 generates and outputs a trace data element including a traced condition value which indicates at least the condition flags 22 of the required subset for which the corresponding control flags 26 are clear. Optionally, the trace condition value may also indicate other condition flags, or may indicate all of the condition flags 22. Then, at step 150, the trace circuit 6 sets the control flags corresponding to the condition flags that were indicated in the traced condition value. If at step 142, the instruction was determined not to be a conditional instruction then steps 144 to 150 are omitted.

At step 152, the trace circuit 6 determines whether or not the instruction being executed by the processing circuit 4 is a condition updating instruction. If the instruction is a condition updating instruction then at step 154 the trace circuit 6 clears at least the control flags 26 corresponding to condition flags 22 that are updated as a result of the condition updating instruction. Optionally, at step 154 the trace circuit 6 may also clear other control flags 26, or may clear all of the control flags 26. If the instruction is not a condition updating instruction then step 154 is omitted. At step 156, it is determined whether or not there is another instruction to be processed by the processing circuit 4. If there is such an instruction, then the method returns to step 140. Otherwise, the method ends at step 158.

Pseudocode for implementing the method of FIG. 11 is indicated below (the term "markers" refers to the control flags 26):

On an instruction:
  If instruction is conditional:
    If any markers for flags required by this instruction are clear:
      Trace at least the flags required
      Set markers for the required flags
  If instruction updates the CPSR:
    Clear at least the markers for updated flags Alternatively, the following pseudocode could be used to implement the method of FIG. 11:

On an instruction:
  If instruction is conditional:
    If any markers for flags required by this instruction are clear:
    Trace at least the flags required
    Set markers for the traced flags
  If instruction updates the CPSR:
    Clear at least the markers for updated flags FIG. 12 shows a method of analysing the trace stream generated by the method of FIG. 11. At step 160, the diagnostic circuit 16 analyses a next instruction indicated in the indication of the instructions executed by the processing circuit 4. If at step 162 it is determined that the next instruction is a conditional instruction, then at step 164 the diagnostic circuit 16 determines the required subset of condition flags for that instruction and determines whether the corresponding diagnostic control flags 28 to the required subset of condition flags are clear or set. At step 166, if step 164 determined that any of the diagnostic control flags 28 corresponding to the required subset of condition flags were clear, then the diagnostic circuit 16 locates in the trace stream an associated trace data element including a first traced condition value. The first traced condition value indicates at least the values of the required subset of condition flags corresponding to clear diagnostic control flags 28. The diagnostic circuit 16 then sets the diagnostic control flags 28 that are clear and correspond to a condition flag 22 of the desired subset.

At step 168, if step 164 determined that any diagnostic control flags 28 corresponding to the required subset of condition flags were set, then the diagnostic circuit 16 locates at least one further trace data element for at least one previous conditional instruction. The further trace data element includes at least one further traced condition value indicating values of the condition flags corresponding to those diagnostic control flags that were set. Then, at step 170 the diagnostic circuit 16 analyses the first traced condition value and/or the at least one further traced condition value (depending on which traced condition values were accessed at steps 166 and 168) and then determines the processing outcome of the current conditional instruction based on those traced condition values. If at step 162 the instruction was determined not to be a conditional instruction, then steps 164 to 170 are omitted.

At step 172, the diagnostic circuit 16 determines whether or not the next indicated instruction is a condition updating instruction. If the next instruction is a condition updating instruction then at step 174 the diagnostic circuit 16 clears at least the diagnostic control flags 28 corresponding to condition flags 22 that were updated as a result of execution of the condition updating instruction (the diagnostic circuit 16 can determine which condition flags 22 were updated based on a deduced processing outcome of the condition updating instruction). Optionally, at step 174 the diagnostic circuit 16 may also clear other of the diagnostic control flags 28, or may clear all of the diagnostic control flags 28. If at step 172 the next instruction is not a condition updating instruction, then step 174 is omitted. At step 176, it is determined whether or not there is another instruction to be analysed. If there is another instruction then the method returns to step 160 while otherwise the method ends at step 178.

FIG. 13 illustrates an example of the application of the method of FIGS. 11 and 12 to the stream of program instructions illustrated previously. In this example, it is assumed that all control flags 26 and diagnostic control flags 28 are cleared in response to a condition updating instruction, but as mentioned above it is also possible to provide an embodiment in which the trace circuit 6 and diagnostic circuit 16 clear only the control flags 26, 28 corresponding to condition flags 22 that have been updated.

In FIG. 13, a branch taken result is indicated in the trace data element generated for a branch instruction. The branch taken result can be used by the diagnostic circuit 16 to determine which instructions were executed by the processing circuit 4.

On encountering a condition updating instruction CMP at memory location 2000, the trace circuit 6 clears all the control flags 26. Similarly, when the diagnostic circuit 16 encounters the condition updating instruction CMP then it clears all of its diagnostic control flags 28.

On execution of a conditional instruction MOVNE at memory location 2004, the trace circuit 6 determines that for the "not equal" condition NE the required subset of condition flags is the Z flag (see FIG. 2). At step 146 of FIG. 11, the trace circuit 6 determines that the control flag 26 corresponding to the Z condition flag is clear and so at step 148 generates a trace data element including a traced condition value indicating the value of at least the Z flag. The control flag corresponding to the Z flag is then set at step 150 of FIG. 11.

In a corresponding way, when analysing the trace stream the diagnostic circuit 16 encounters the conditional instruction MOVNE at memory location 2004 and determines that the required subset of condition flags is the Z flag. At this point, the diagnostic control flag 28 corresponding to the Z condition flag is clear and so the diagnostic circuit 16 determines that there is an associated trace data element corresponding to the MOVNE instruction. The diagnostic circuit 16 locates the associated trace data element, which includes a traced condition value indicating a value of the Z flag. The diagnostic circuit 16 determines the processing outcome based on the traced condition value for the MOVNE instruction stored at memory location 2004. The diagnostic circuit 16 then sets the diagnostic control flag 28 corresponding to the Z flag.

When the trace circuit 6 encounters the conditional instruction MOVEQ stored at memory location 2008, the trace circuit 6 determines that the required subset of flags for determining whether the "equals" condition EQ is satisfied is again the Z flag (see FIG. 2). At step 146 of FIG. 11, the trace circuit 6 determines that the control flag corresponding to the Z flag is set and so omits steps 148 and 150 of FIG. 11 and does not generate a trace data element including a traced condition value. On analysing the trace stream, the diagnostic circuit 16 can similarly detect that the diagnostic control flag 28 corresponding to the Z flag is set. Therefore, the diagnostic circuit 16 will at step 168 of FIG. 12 locate the trace data element for the previous conditional instruction MOVNE stored at memory location 2004, and determine the outcome of the MOVEQ instruction based on the traced condition value included in the trace data element for the MOVNE instruction.

At memory location 200C there is a conditional add instruction ADDHI which is dependent on the HI condition. When this instruction is executed, the trace circuit 6 determines that the required subset of condition flags is the C flag and the Z flag (see FIG. 2). The trace circuit 6 determines the status of the corresponding control flags 26 corresponding to the C and Z flags, and determines that the control flag 26 corresponding to the Z condition flag is set, but the control flag 26 corresponding to the C condition flag is still clear.

Therefore, at step 148 of FIG. 11, the trace circuit 6 generates a trace data element including at least the value indicating the C flag. The control flag 26 corresponding to the C condition flag is then set.

On analysing the trace stream, the diagnostic apparatus 12 detects that the required subset of condition flags for the ADDHI instruction at memory location 200C is the C and Z flags. Since the diagnostic control flag 28 corresponding to the C flag is clear, at step 166 the diagnostic circuit 16 will locate in the trace stream a trace data element associated with the ADDHI instruction that indicates the C flag value. At step 168 of FIG. 12, the diagnostic circuit 16 will also locate a further trace data element, because the diagnostic control flag 28 for the Z condition flag was set at step 164. In this example, the further trace data element is the trace data element generated for the MOVNE instruction at memory location 2004. At step 170 of FIG. 12, the diagnostic circuit 16 determines a processing outcome of the ADDHI instruction based on both the traced condition value included in the trace data element for the MOVNE instruction at memory location 2004 and the trace condition value included in the trace data element for the ADDHI instruction at memory location 200C.

In a similar way, the trace circuit 6 generates trace data and the diagnostic circuit 16 analyses the trace data for the subsequent instructions shown in FIG. 13.

While the above embodiments have described the control flags 26 and diagnostic control flags 28 being cleared when the condition flags 22 are updated, other events may also trigger the control flags 26 or diagnostic control flags 28 to be cleared. For example, an exception event may cause the control flags to be cleared. If the exception handler triggered by the exception event is being traced by the trace circuit 6, then clearing the control flags 26 on occurrence of an exception event ensures that the condition flags 22 will be traced on initiation of the exception handler. Alternatively, if the exception handler is not being traced, then clearing the control flags 26 on occurrence of the exception event can ensure that the condition flags 22 will be traced following a return from exception handling.

Also, the trace circuit 6 may periodically clear the control flags, so that a traced condition value is included periodically in the trace stream to provide a reference point for the diagnostic apparatus 12. The diagnostic circuit 16 can begin analysing the trace data at the reference point, since the traced condition value included at the reference point enables the state of the condition flags to be determined without requiring information from previous trace data elements. This is useful since the diagnostic circuit 16 is able to jump directly to a region of the trace stream of interest rather than having to work through the entire trace stream to reach the region of interest.

Also, to improve processing performance some processors may perform speculative execution of instructions before it is known whether or not that instruction should actually be executed. Sometimes, one or more speculatively executed instructions should not in fact have been executed. On detecting a mis-speculation, the processor may reverse the results of any incorrectly executed instruction to recover the processor state arising before execution of the incorrectly executed instruction. It may be unknown to the trace circuit 6 how many instructions were incorrectly executed. To ensure that the condition flag values resulting from correction of the mis-speculation can be determined from the trace stream, the trace circuit 6 may clear the control flags 26 on detection of a mis-speculation.

For any of these events, the trace circuit 6 may include in the trace stream information indicating that the control flags 26 have been cleared. The diagnostic circuit 16 may respond to this information by clearing the diagnostic control flags 28.

FIGS. 8-13 illustrate embodiments in which a traced condition value indicating values of the condition flags 22 is included in the trace stream to enable the outcome of a conditional instruction to be determined by the diagnostic apparatus 12. However, these techniques may also be applied to embodiments where another kind of outcome indicating value (for instance, a pass/fail result) is included in the trace stream to enable the outcome of the conditional instruction to be determined.

Although illustrative embodiments of the invention have been described in detail herein, with reference to the accompanying drawings, it is to be understood that the invention is not limited to those precise embodiments, and that various changes and modifications can be made by one skilled in the art without departing from the scope of the invention that is defined by the appended claims.

We claim:

1. A processing apparatus comprising:
  processing circuitry configured to perform processing operations in response to program instructions;
  a condition status storage location configured to store at least one condition flag indicating a condition of said processing circuitry; and
  trace circuitry configured to generate trace data elements indicative of said processing operations performed by said processing circuitry in response to said program instructions; wherein:
  said processing circuitry is responsive to at least one conditional instruction to perform a conditional operation in dependence on a current value of a subset of said at least one condition flag; and
  said trace circuitry is configured, in response to said processing circuitry processing at least one of said at least one conditional instruction, to generate a trace data element including a traced condition value indicative of at least said subset of said at least one condition flag, said traced condition value providing information for determining a processing outcome of said at least one conditional instruction,
  said trace circuitry is configured to store a control flag,
  said trace circuitry is responsive to said control flag to select whether to generate for a given program instruction said trace data element including said traced condition value,
  said control flag has a first state and a second state,
  said trace circuitry is responsive to an update of said at least one condition flag to place said control flag in said first state, and
  said trace circuitry is responsive to said processing circuitry processing a conditional instruction to:
  (a) determine whether said control flag is in said first state; and
  (b) if said control flag is in said first state, generate a trace data element including said traced condition value and place said control flag in said second state.

2. The processing apparatus according to claim 1, wherein said traced condition value comprises an identifier identifying a value of at least said subset of said at least one condition flag.

3. The processing apparatus according to claim 1, wherein said traced condition value comprises a value of at least said subset of said at least one condition flag.

4. The processing apparatus according to claim 1, wherein said trace circuitry is configured, in response to said processing circuitry processing said at least one of said at least one conditional instruction, to generate said trace data element with said traced condition value being indicative of the current value of at least said subset of said at least one condition flag at the time of processing said at least one of said at least one conditional instruction.

5. The processing apparatus according to claim 1, wherein said at least one of said at least one conditional instruction comprises a first conditional instruction processed after an update of said at least one condition flag.

6. The processing apparatus according to claim 1, wherein said trace circuitry is configured to select which of said program instructions trigger generation of said trace data element including said traced condition value.

7. The processing apparatus according to claim 1, wherein said condition status storage location is configured to store a plurality of condition flags corresponding to respective conditions of said processing circuitry.

8. The processing apparatus according to claim 7, wherein said conditional operation is dependent on current values of a subset of said plurality of condition flags, and said trace circuitry is configured to generate said trace data element with said traced condition value being indicative of said subset of said plurality of condition flags.

9. The processing apparatus according to claim 7, wherein said trace circuitry is configured to generate said trace data element with said traced condition value being indicative of all of said plurality of condition flags.

10. The processing apparatus according to claim 7, wherein said trace circuitry is configured to store a plurality of control flags corresponding to said plurality of condition flags, said trace circuitry being responsive to each control flag to select whether or not to generate for a given program instruction a trace data element including a traced condition value indicative of the corresponding condition flag.

11. The processing apparatus according to claim 10, wherein said plurality of control flags each have a first state and a second state;
  said trace circuitry is responsive to an update of any of said plurality of condition flags to place in said first state at least the control flags corresponding to condition flags that have been updated; and
  said trace circuitry is responsive to said processing circuitry processing one of said at least one conditional instruction that is dependent on a required subset of condition flags to:
  (a) determine whether any of the corresponding control flags corresponding to said required subset of condition flags are in said first state; and
  (b) if any of said corresponding control flags are in said first state, generate a trace data element including a traced condition value indicative of at least the condition flags of said required subset whose corresponding control flags are in said first state, and to place said corresponding control flags in said second state.

12. The processing apparatus according to claim 1, wherein said conditional operation of said at least one conditional instruction is a non-branch operation.

13. A processing apparatus comprising:
  processing means for performing processing operations in response to program instructions;
  condition status storage means for storing at least one condition flag indicating a condition of said processing means; and
  trace means for generating trace data elements indicative of said processing operations performed by said processing means in response to said program instructions; wherein:

said processing means is responsive to at least one conditional instruction to perform a conditional operation in dependence on a current value of a subset of said at least one condition flag; and said trace means is configured, in response to said processing means processing at least one of said at least one conditional instruction, to generate a trace data element including a traced condition value indicative of at least said subset of said at least one condition flag, said traced condition value providing information for determining a processing outcome of said at least one conditional instruction, said trace means is configured to store a control flag, said trace means is responsive to said control flag to select whether to generate for a given program instruction said trace data element including said traced condition value, said control flag has a first state and a second state, said trace means is responsive to an update of said at least one condition flag to place said control flag in said first state, and said trace means is responsive to said processing means processing a conditional instruction to:

(a) determine whether said control flag is in said first state; and (b) if said control flag is in said first state, generate a trace data element including said traced condition value and place said control flag in said second state.

14. A trace unit for monitoring processing operations performed by a processing apparatus in response to program instructions, said processing apparatus comprising a condition status storage location configured to store at least one condition flag indicating a condition of said processing apparatus, said processing apparatus being responsive to at least one conditional instruction to perform a conditional operation in dependence on a current value of a subset of said at least one condition flag, said trace unit comprising:

trace circuitry configured to generate trace data elements indicative of said processing operations performed by said processing apparatus in response to said program instructions; wherein:

said trace circuitry is configured, in response to said processing apparatus processing at least one of said at least one conditional instruction, to generate a trace data element including a traced condition value indicative of at least said subset of said at least one condition flag, said traced condition value providing information for determining a processing outcome of said at least one conditional instruction, said trace circuitry is configured to store a control flag having a first state and a second state;

said trace circuitry is responsive to an update of said condition of said processing apparatus to place said control flag in said first state; and said trace circuitry is responsive to said processing apparatus processing one of said at least one conditional instruction to:

(a) determine whether said control flag is in said first state; and (b) if said control flag is in said first state, generate a trace data element including an outcome indicating value for providing information on a processing outcome of said at least one conditional instruction and place said control flag in said second state.

15. A trace unit for monitoring processing operations performed by a processing apparatus in response to program instructions, said processing apparatus comprising condition status storage means for storing at least one condition flag indicating a condition of said processing apparatus, said processing apparatus being responsive to at least one conditional instruction to perform a conditional operation in dependence on a current value of a subset of said at least one condition flag; said trace unit comprising:

trace means for generating trace data elements indicative of said processing operations performed by said processing apparatus in response to said program instructions; wherein:

said trace means is configured, in response to said processing apparatus processing at least one of said at least one conditional instruction, to generate a trace data element including a traced condition value indicative of at least said subset of said at least one condition flag, said traced condition value providing information for determining a processing outcome of said at least one conditional instruction, said trace means is configured to store a control flag having a first state and a second state;

said trace means is responsive to an update of said condition of said processing apparatus to place said control flag in said first state; and said trace means is responsive to said processing apparatus processing one of said at least one conditional instruction to:

(a) determine whether said control flag is in said first state; and (b) if said control flag is in said first state, generate a trace data element including an outcome indicating value for providing information on a processing outcome of said at least one conditional instruction and place said control flag in said second state.

16. A method of data processing comprising steps of:

in response to program instructions, performing processing operations using a processing apparatus;

storing at least one condition flag indicating a condition of said processing apparatus; and generating trace data elements indicative of said processing operations; wherein:

said step of performing processing operations includes performing, in response to at least one conditional instruction, a conditional operation in dependence on a current value of a subset of said at least one condition flag; and said step of generating trace data elements includes:

storing a control flag having a first state and a second state;

in response to an update of said condition of said processing apparatus, placing said control flag in said first state, in response to processing said at least one conditional instruction, (a) determining whether said control flag is in said first state; and (b) if said control flag is in said first state, generating a trace data element including a traced condition value indicative of at least said subset of said at least one condition flag, said traced condition value providing information for determining a processing outcome of said at least one conditional instruction, and placing said at least one condition flag in said second state.

17. A processing apparatus comprising:

processing circuitry configured to perform processing operations in response to program instructions; and trace circuitry configured to generate trace data elements indicative of said processing operations performed by said processing circuitry in response to said program instructions; wherein:

said processing circuitry is responsive to at least one conditional instruction to perform a conditional operation in dependence on a condition of said processing circuitry;

said trace circuitry is configured to store a control flag having a first state and a second state;

said trace circuitry is responsive to an update of said condition of said processing circuitry to place said control flag in said first state; and said trace circuitry is responsive to said processing circuitry processing one of said at least one conditional instruction to:

(a) determine whether said control flag is in said first state; and (b) if said control flag is in said first state, generate a trace data element including an outcome indicating value for providing information on a processing outcome of said at least one conditional instruction and place said control flag in said second state.

18. A processing apparatus comprising:

processing means for performing processing operations in response to program instructions; and trace means for generating trace data elements indicative of said processing operations performed by said processing means in response to said program instructions; wherein:

said processing means is responsive to at least one conditional instruction to perform a conditional operation in dependence on a condition of said processing means;

said trace means is configured to store a control flag having a first state and a second state;

said trace means is responsive to an update of said condition of said processing means to place said control flag in said first state; and said trace means is responsive to said processing means processing one of said at least one conditional instruction to:

(a) determine whether said control flag is in said first state; and (b) if said control flag is in said first state, generate a trace data element including an outcome indicating value for providing information on a processing outcome of said at least one conditional instruction, and place said control flag in said second state.

19. A method of data processing comprising steps of:

in response to program instructions, performing processing operations using a processing apparatus, said performing processing operations including performing, in response to at least one conditional instruction, a conditional operation in dependence on a condition of said processing circuitry; and generating trace data elements indicative of said processing operations, said trace data elements being generated in dependence on a control flag having a first state and a second state; wherein said step of generating trace data elements includes:

in response to an update of said condition of said processing circuitry, placing said control flag in said first state; and in response to processing of one of said at least one conditional instruction, (a) determining whether said control flag is in said first state; and (b) if said control flag is in said first state, generating a trace data element including an outcome indicating value for providing information on a processing outcome of said at least one conditional instruction, and placing said control flag in said second state.

\* \* \* \* \*